E. R. KAST.
SIGNATURE GATHERER.
APPLICATION FILED JULY 17, 1909.
1,236,181.
Patented Aug. 7, 1917.
8 SHEETS—SHEET 8.
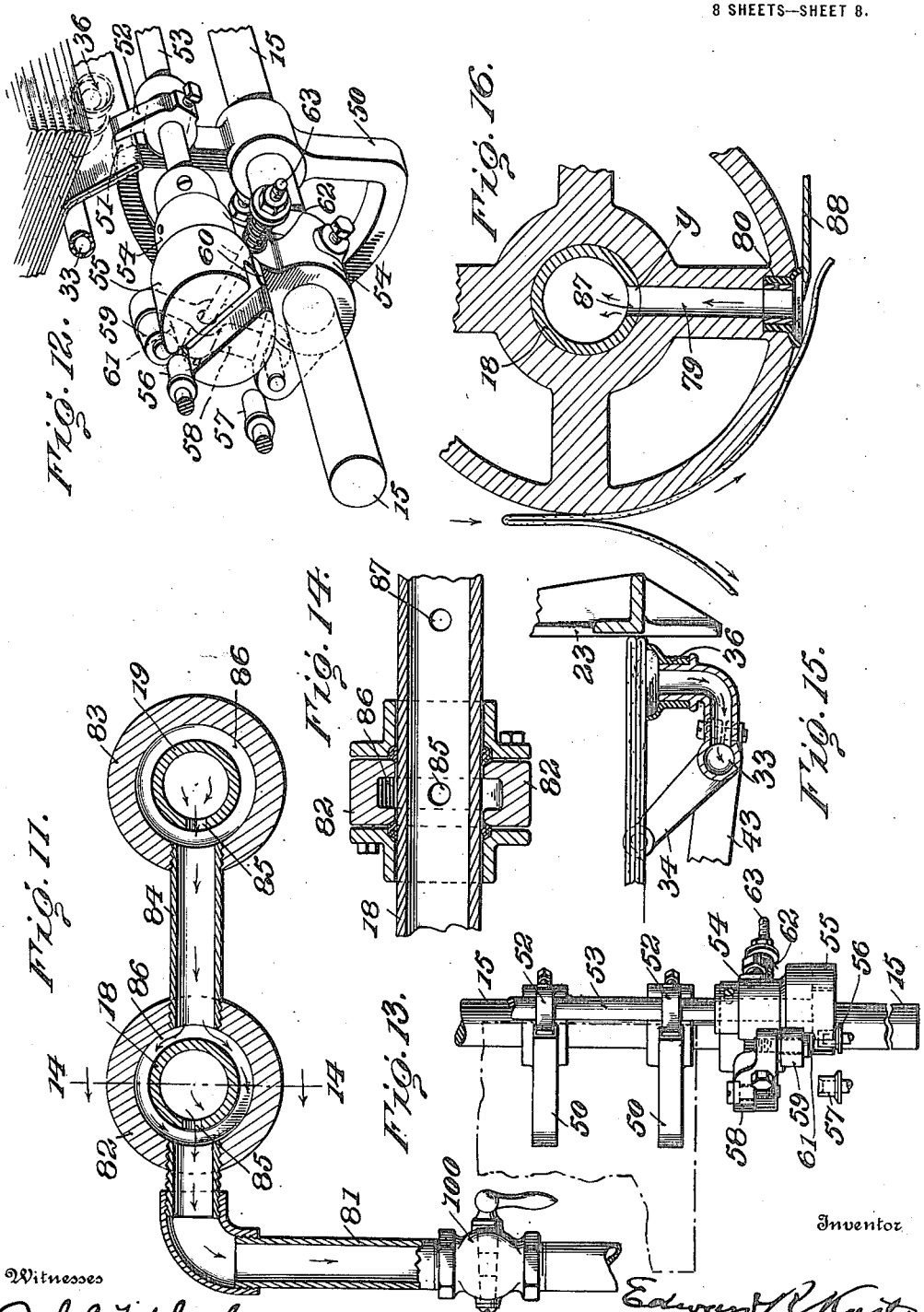

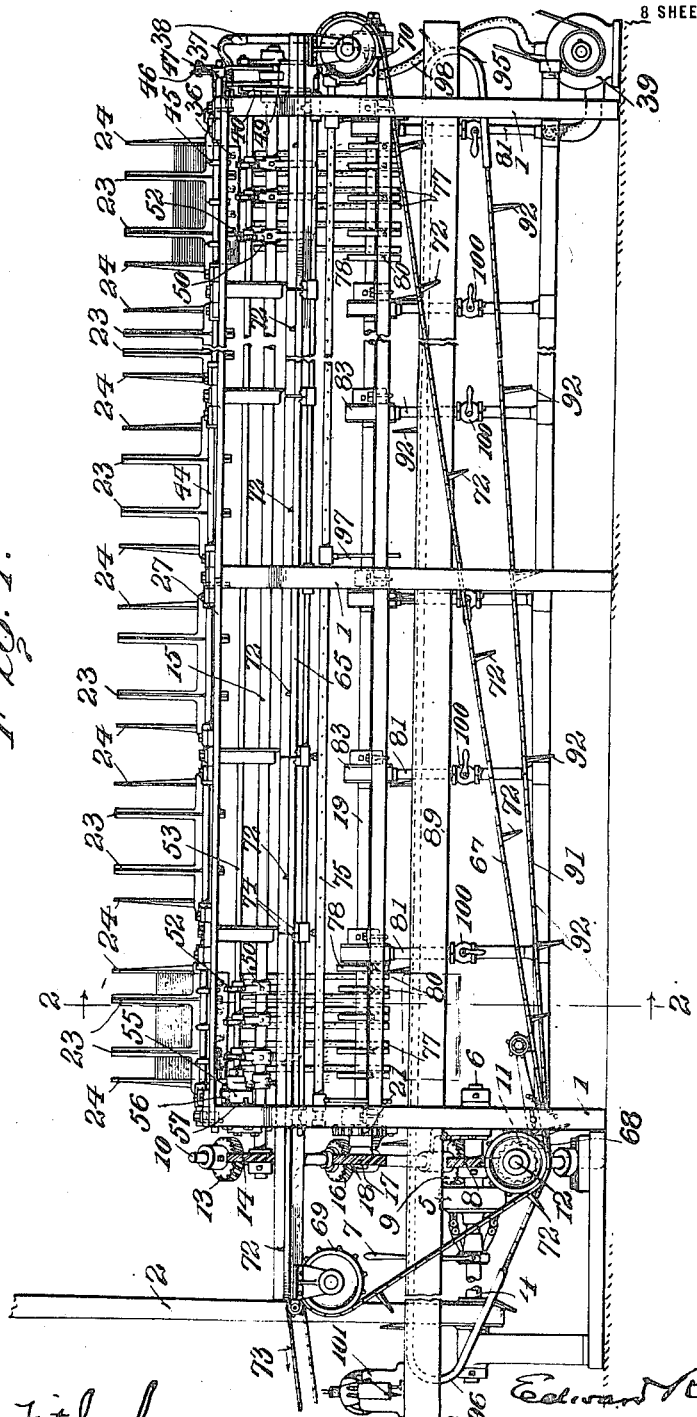

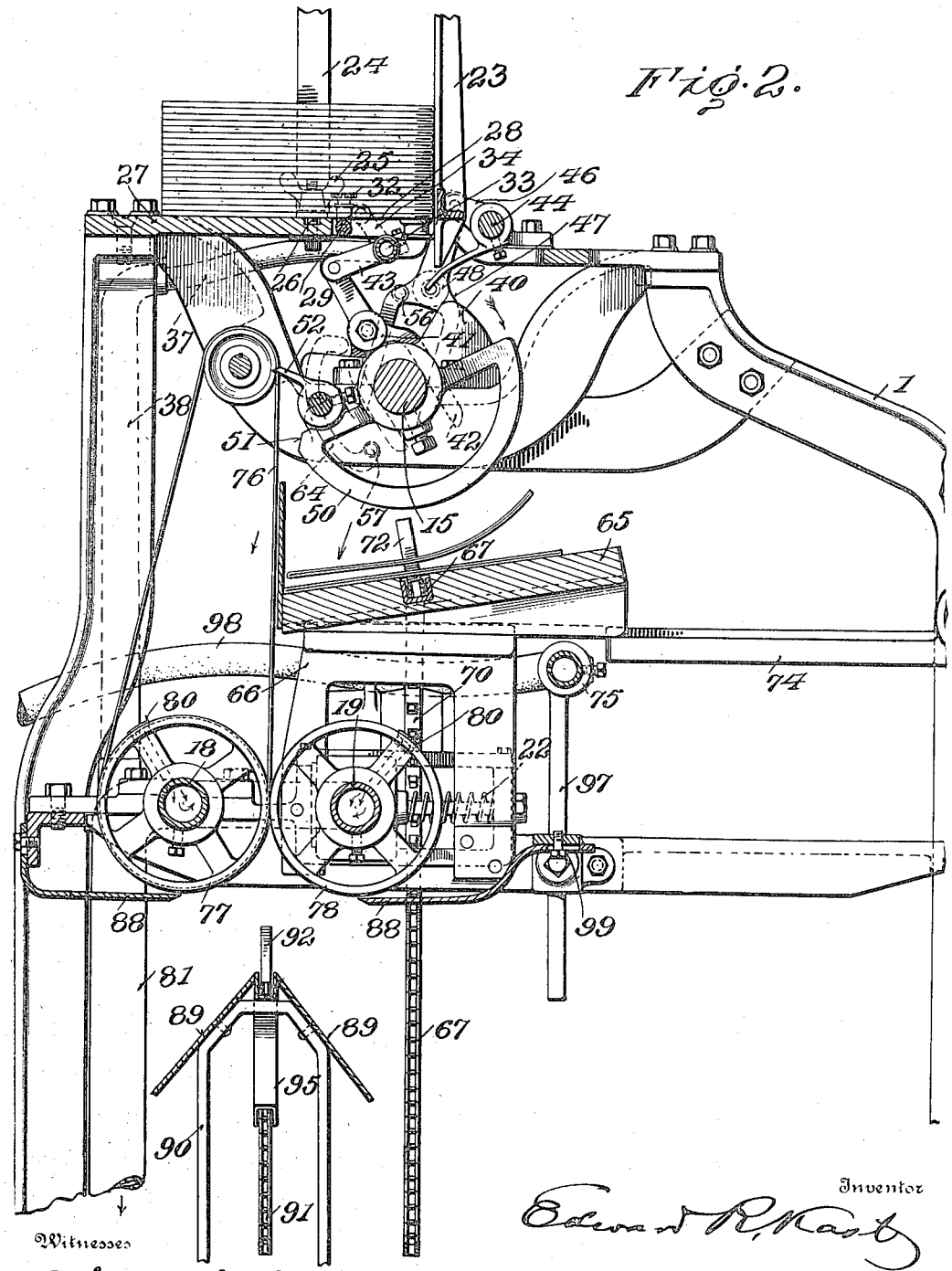

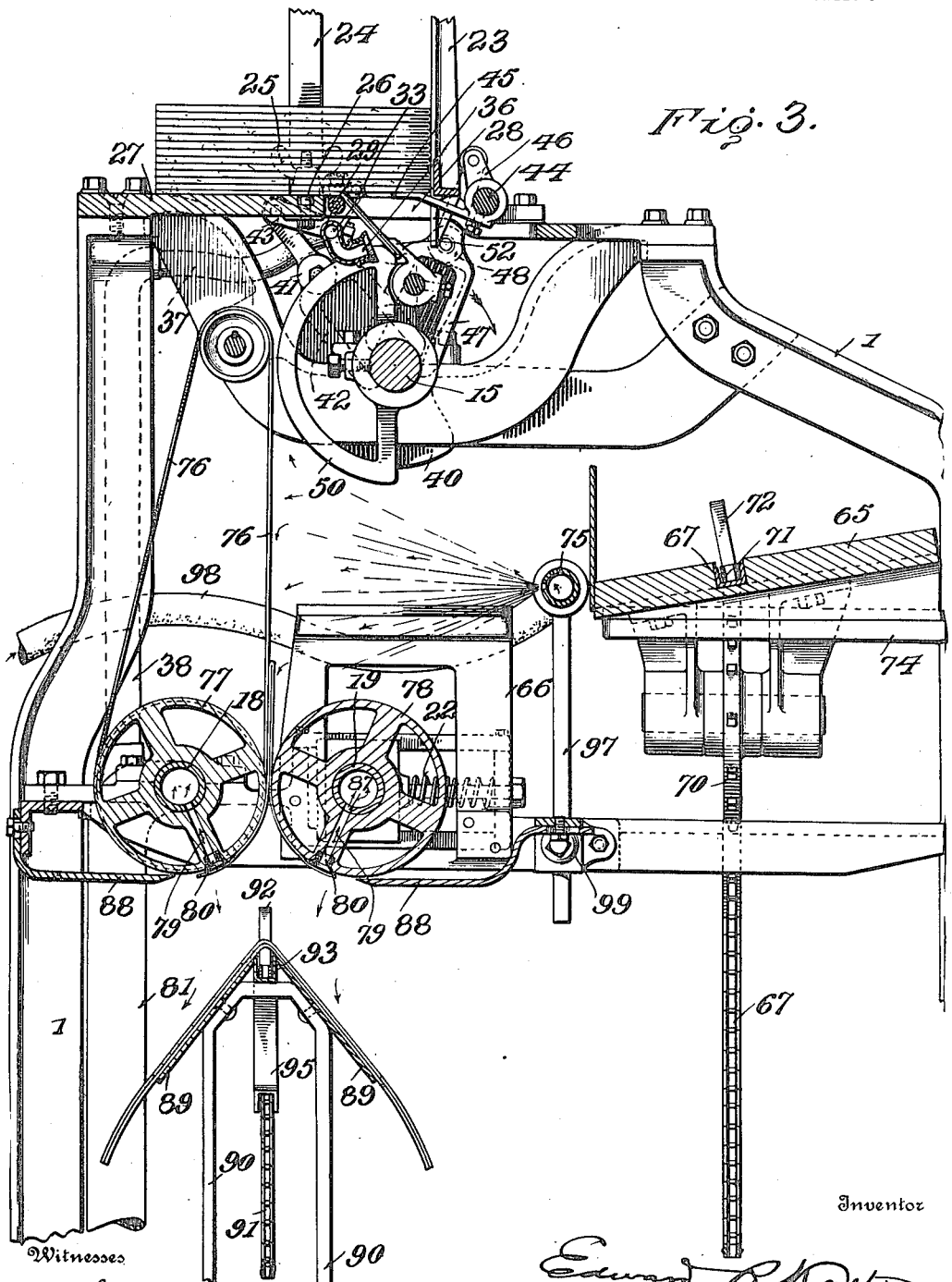

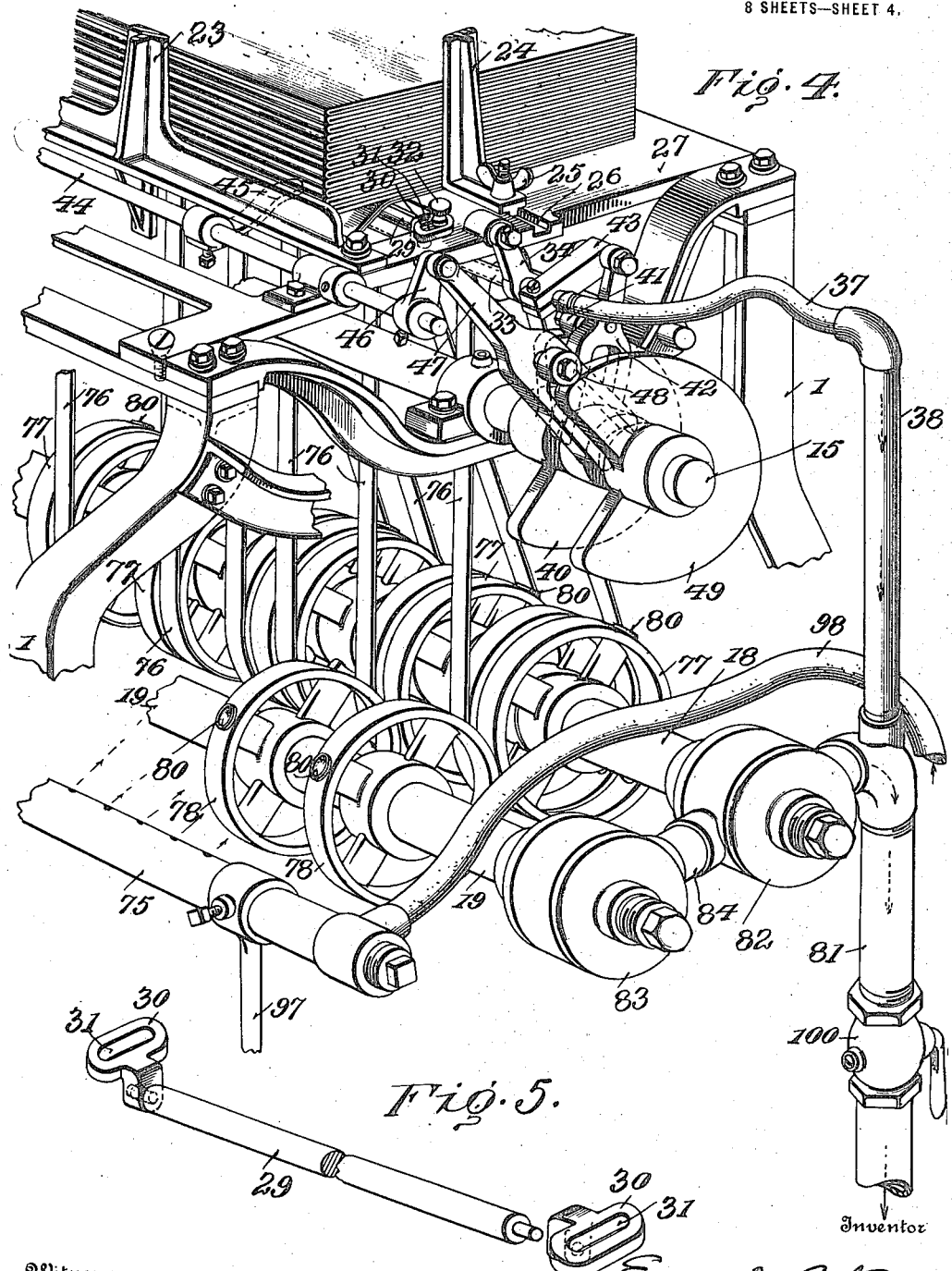

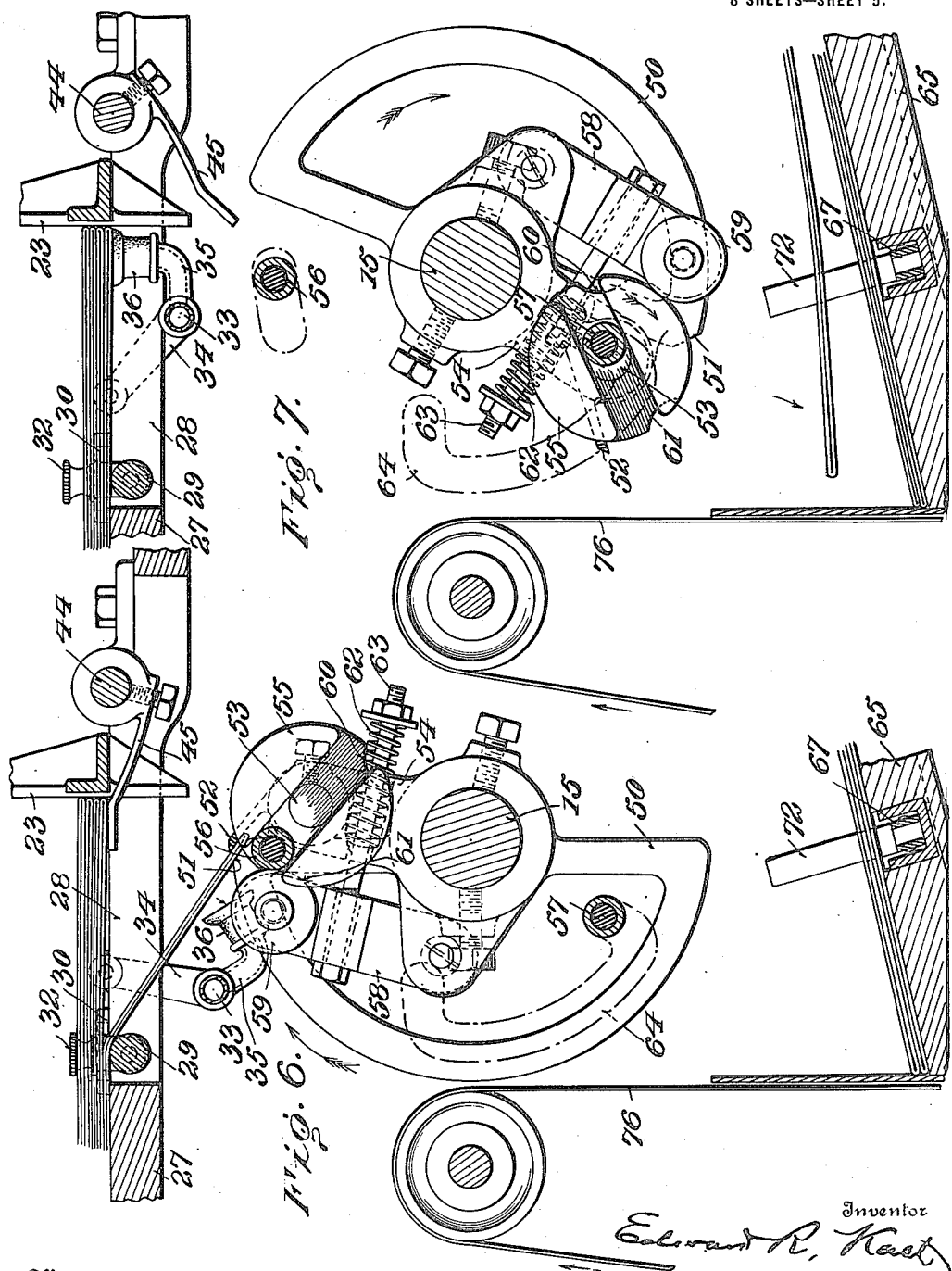

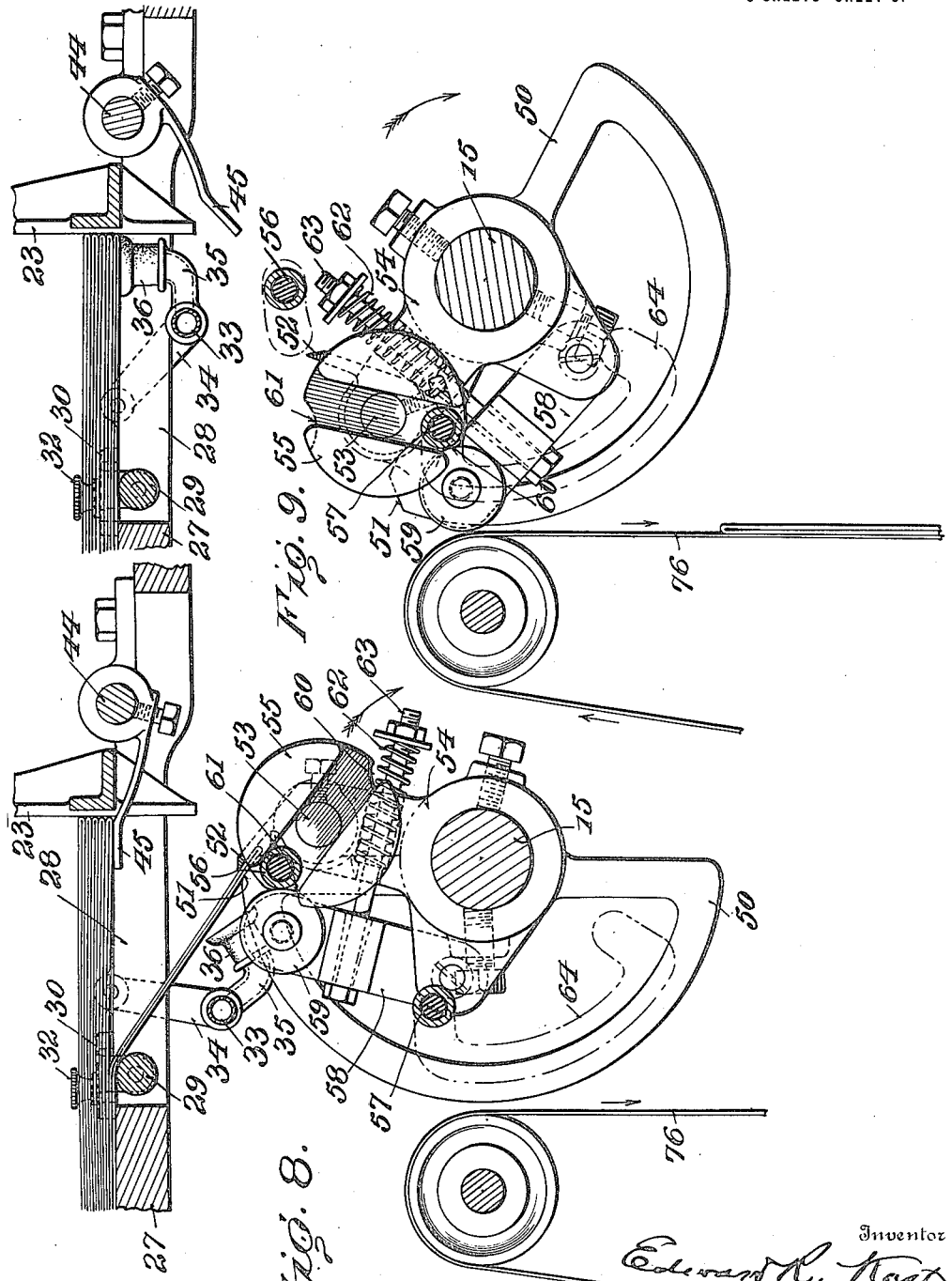

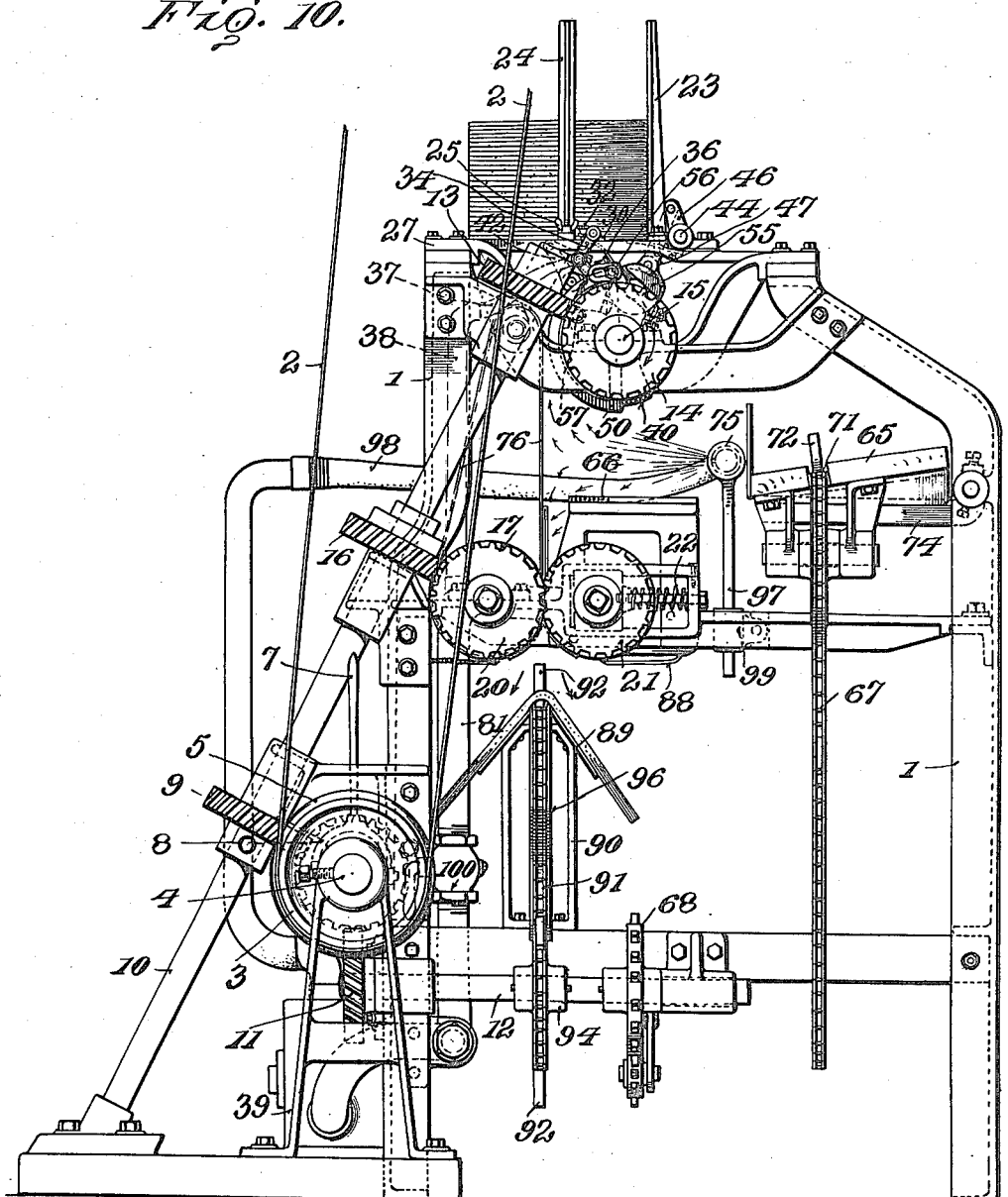

UNITED STATES PATENT OFFICE.

EDWARD R. KAST, OF BALTIMORE, MARYLAND, ASSIGNOR TO KAST INSETTING AND GATHERING MACHINE COMPANY, A CORPORATION OF DELAWARE.

SIGNATURE-GATHERER.

1,236,181.   Specification of Letters Patent.   Patented Aug. 7, 1917.

Application filed July 17, 1909.   Serial No. 508,160.

*To all whom it may concern:*

Be it known that I, EDWARD R. KAST, of Baltimore, Maryland, have invented a new and useful Improvement in Signature-Gatherers, which invention is fully set forth in the following specification.

This invention relates to the art of assembling printed sheets or "signatures" in the order desired for binding. In this art the act of assembling "signatures" one within the other is technically known as "insetting"; and if the signatures are assembled one on top of the other, the act will be herein referred to as "piling."

The object of the present invention is to provide a machine which shall automatically and accurately inset or pile the signatures, according to whether the machine is adjusted for insetting or piling, which machine shall be efficient in operation, and which shall require no labor on the part of the attendants, except to replenish the supply of signatures in the hoppers and to remove the assembled signatures.

With this object in view, the invention consists of a series of signature-receiving frames or hoppers, each holding a supply of signatures, all of the signatures in any one hopper being alike, but no two hoppers having signatures of the same kind. The several signatures are placed in the series of hoppers in the order in which they are to occupy when assembled, *i. e.*, the first signature is in the first hopper, the second signature in the second hopper, and so on throughout the series. Means are provided for withdrawing the signatures one at a time from each hopper and placing them one on top of the other (in piling) in the order in which the hoppers are arranged, *i. e.*, the signature from the second hopper is placed on top of the signature from the first hopper, that from the third hopper on top of that from the second hopper, and so on. For insetting, the signatures are withdrawn from the hoppers in the same order as when piling, each signature being then opened and placed in a position inclosing that of the signature previously withdrawn.

As a signature is withdrawn from one hopper, it is advanced on a suitable table or support to a position to receive the signature from the next hopper in the series. Two such tables or supports are provided, one for use in piling and one for insetting, the two tables or supports being so arranged and combined with the other parts of the mechanism that either table can be brought into operation at will while the other is thrown out of operation. Preferably the table or support used in piling is in the form of a flat surface slightly inclined from the horizontal with its highest edge toward the front of the machine, and mounted in the framework of the machine, so that it may be slid forward into or backward out of operative position. Preferably, also, the table or support for receiving the signatures when insetting consists of two surfaces inclined upward toward each other, so that in cross-section they resemble an inverted V, and the signatures when opened are dropped upon this table or support as upon a saddle, the open signature straddling the same.

The hoppers have bottoms capable of adjustment so as to leave an opening therein through which the bottom signature is removed by the mechanism, the folded edge of the signature being first pulled down by suitable devices (preferably pneumatic devices, which I designate "suckers"), and then grasped by a moving part of the machine and completely withdrawn from the hopper. In piling, the withdrawn signature is released by this grasping mechanism, and dropped directly on the table, but for insetting, when the signature is released by the grasping mechanism, it is carried to a suitable device for opening the signature, and then dropped in this opened condition on the saddle or insetting table. Preferably when the grasping mechanism drops the signature for insetting, the signature is carried by an air-blast against a suitable carrier, by which it is conveyed between two oppositely disposed rollers revolving in opposite directions, and each provided with suction devices which act to open the signatures and at the proper moment drop them on the saddle or table.

The entire series of signatures having been assembled, either by insetting or piling as the case may be, may be then removed from the machine for stitching or binding in any desired way. Preferably, however, the signatures, after the insetting is completed, are automatically advanced directly from the insetting saddle or table to a stitching machine, in which case the work need not be handled by the operator until the stitching is complete.

The invention further consists in certain details of construction which will be hereinafter fully described and then pointed out in the claims.

The inventive idea involved is capable of receiving a variety of mechanical expressions, one of which, for the purpose of illustrating the invention, is shown in the accompanying drawings, but it is to be expressly understood that such drawings are not for the purpose of defining the limits of the invention, reference being had to the claims hereto appended for this purpose.

In said drawings, Figure 1 is a front elevation of the machine, certain of the duplicate parts of the mechanism, however, being omitted for clearness of illustration;

Fig. 2 is a cross-section on the line 2—2 of Fig. 1 looking to the right, and showing the parts in position for piling;

Fig. 3 is a cross-sectional view taken on the same line as Fig. 2, showing the parts in position for insetting;

Fig. 4 is a perspective view of the right-hand end of the machine, some parts being broken away and others omitted for clearness of illustration;

Fig. 5 is a broken detailed perspective of the roller employed for adjusting the size of the opening in the bottom of the signature rack or hopper;

Fig. 6 is a vertical detailed section illustrating the position of the parts in piling, and showing the grasping mechanism just in the act of withdrawing a signature from the hopper;

Fig. 7 is a like view to Fig. 6, but showing the position of the parts just after a signature has been released by the machine, the signature being shown in the act of falling upon the table;

Fig. 8 is a detailed cross-sectional view, showing the position of the parts in the act of withdrawing a signature from the hopper for insetting;

Fig. 9 is a like view to Fig. 8, with the parts in the position which they occupy just after the signature has been released by the withdrawing mechanism and forced by the air-blast against the carrier which delivers it between the opening rolls;

Fig. 10 is a left-hand end elevation of Fig. 1, with the parts in insetting position;

Fig. 11 is a sectional detail showing the means for effecting the suction in the opening rolls;

Fig. 12 is a detailed perspective showing the tumbler mechanism for operating the devices to grasp the sheet in withdrawing it from the hopper and release the same at the proper moment;

Fig. 13 is a broken detail plan of the mechanism shown in Fig. 12;

Fig. 14 is a sectional detail on the line 14—14 of Fig. 11;

Fig. 15 is a sectional detail of the sucker mechanism for holding down the signatures in a position to be grasped by the withdrawing devices; and Fig. 16 is a broken sectional detail illustrating the construction of the opening rolls used in insetting.

Like reference numerals indicate like parts throughout the several views of the drawings. Referring to Figs. 1 and 10, 1 indicates the framework of the machine, which may be of any suitable length to accommodate the number of signatures which it is desired to assemble, here shown as six. A continuously driven belt 2, leading from any suitable source of power, drives the pulley 3 on a shaft 4, which shaft is connected by any suitable clutch mechanism 5 to a second shaft 6, said clutch mechanism being operated by the lever 7 to throw the power on and off, in a way well understood in the art. On the shaft 6 is a suitable gear 8, engaging a gear 9 keyed to an inclined shaft 10, having suitable bearings in the top and the bottom of the frame 1. The gear 8 on the shaft 4 also engages a suitable gear 11 on a horizontal shaft 12. The entire mechanism of the machine is driven through the shafts 10 and 12, as will be hereinafter more fully described.

At the upper end of the shaft 10 is a suitable gear 13, meshing with a gear 14 keyed to a shaft 15, having bearings in the frame, and extending throughout the length of the machine. Keyed to the shaft 10 between gears 9 and 13 is a suitable gear 16, meshing with a suitable gear 17 (Fig. 1) keyed to a shaft 18, also extending throughout the length of the machine and having suitable bearings in the frame 1. Parallel with the shaft 18 is a second shaft 19, the two shafts 18 and 19 being hollow and geared together by gears 20 and 21 on the respective shafts. As shown in Figs. 2 and 3, the shaft 19 is mounted in sliding bearings, and is pressed toward the shaft 18 by springs 22.

The parts heretofore described constitute the driving mechanism of the machine, from which all of the mechanism for withdrawing the signatures from the hoppers, delivering the same to the insetting or piling table, and advancing the delivered signatures along said table, is driven.

The racks or hoppers for receiving the signatures may be of any suitable construction, preferably open at one side, and as here shown, they consist of uprights 23 bolted in a straight row to the top of the framework of the machine, and constituting the front edge of the hoppers. The sides of the hoppers consist of like uprights 24, preferably one on each side of each hopper. These side uprights are made adjustable, in order that the hoppers may be adjusted to the size of the signature being handled. This adjustment may be secured in any suitable way, as by means of a screw clamp 25 engaging the groove 26 in the plate 27, constituting the top of the frame of the machine. This plate 27, however, does not extend to the uprights 23, a slot or opening 28 being left between the edge of the plate 27 and said uprights, through which slot or opening the signatures are withdrawn in the operation. In order to adjust the size of this slot or opening 28 for signatures of different stiffness or for different qualities of paper, a roller bar 29 (Fig. 5) extends under all the hoppers throughout the entire length of the slot, and is provided at its ends with hangers 30, having slots 31 formed therein, through which set screws 32 (Fig. 4) are passed, thereby permitting a horizontal adjustment of the roller bar 29.

Referring now to Figs. 6, 7, 8 and 9, 33 is a tube rigidly carried on the lower ends of links 34, which are secured at their upper ends to swing on the frame 1, and 35 are hollow suction members (preferably two for each signature hopper) provided with mouthpieces 36, preferably of rubber, such suction members 35 being in open communication with the tube 33. The tube 33 is connected by tube 37, preferably of flexible material, with a standpipe 38 (see Figs. 1 and 4) leading to any suitable exhaust device, as an air-pump or fan 39, to the end that suction may be created at the mouth pieces 36. For the purpose of swinging the sucker mouths 36 to and from the bottom signature in the hopper, a cam 40 is keyed to the right-hand end of the shaft 15 (Fig. 4), on which cam travels a roller 41 projecting from the side of the fork 42, straddling the shaft 15 and pivoted at its upper end to a link 43, which is rigidly secured at its other end to the tube 33, so that the link 34 and the link 43 form in effect the members of a rigid bent lever, with the tube 33 passing through the elbow or bend of the lever, and the lever being fulcrumed on the frame at the upper end of the link 34. The result of this construction is that when the roller 41 drops off of the periphery of the cam 40, and the fork takes the position shown in Fig. 2 by reason of the weight of the parts, the tube 33, and with it the sucker-mouths 36, are thrown upward against the bottom signature in the hoppers, as shown in Fig. 2. When, however, the roller 41 rides on the outer periphery of the cam 40, as shown in Fig. 4, the bent lever composed of the links 43 and 34 is swung to the left of the position shown in Fig. 3, thereby withdrawing the sucker-mouths 36 and pulling down the folded edge of the bottom signature in the hopper to the position indicated in Fig. 4.

For the purpose of preventing the folded edge of the remaining signatures from dropping downward at the time when the bottom signature is withdrawn, a rock shaft 44 (Fig. 4) is mounted in suitable bearings on the frame 1, and is provided with fingers 45, so keyed thereto as to project under the folded edge of the signatures in the hopper when the rock shaft is in one position, but to be withdrawn therefrom when the rock shaft is rocked, the two positions being clearly illustrated in Figs. 6 to 9 inclusive. The rocking of the shaft 44 so as to move the fingers from the position shown in Fig. 7 to the position shown in Fig. 8, occurs just after the sucker-mouths 36 have acted to withdraw the bottom signature out of the path of the movement of the fingers 45, so that the remaining signatures in the hopper are supported by the fingers 45 while the bottom signature is being withdrawn.

For the purpose of rocking the shaft 44, there is keyed to the end of the shaft a crank-arm 46 (Fig. 4), which is pivotally connected to the shank of a fork 47, straddling the shaft 15 and having a roller 48 projecting from the side thereof, and bearing on a cam 49. When the roller travels on the outer periphery of the cam, the fork is raised, and thereby rocks the shaft 44 so as to bring the fingers 45 up under against the signatures, but when the roller 48 drops off of the curved portion of the periphery of the cam into the cut-away portion thereof (which it does by its own weight), the shaft 44 is rocked so as to withdraw the fingers 45 from the position shown in Fig. 6 to that shown in Fig. 7. This withdrawal of the fingers 45 occurs just as the sucker-mouths 36 are in the act of descending to withdraw the bottom signature.

When the folded edge of the signature is drawn downward by the sucker-mouthe 36, it is grasped by mechanism for withdrawing it from the hopper, which mechanism is illustrated in detail in Figs. 6 to 9 inclusive, and consists of a plurality of members, here shown as semi-cylindrical surfaces 50 keyed to the shaft 15. These surfaces 50 are all of substantially the same construction, and therefore a description of one of them will serve as a description for all. Each of the members 50 is provided with a suitable clamping surface, here shown as the beveled corner 51, against which the edge of the signature that has been pulled downward by the sucker-mouthe 36 is clamped by a series of clamping fingers 52 carried on a rock shaft 53 having bearings in bracket arms 54 keyed to the shaft 15. The result of this construction is that the rock shaft 53 revolves with the shaft 15. For the purpose of rocking the shaft 53 to cause the fingers 52 to grasp and to release the signatures at the proper moment, there is fixed to the left-hand end of the rock shaft 53 a tumbler 55 in the form of a thick cylindrical disk, keyed to the shaft 53, and having a diametrical groove formed in the outer face thereof. Projecting from the inner face of the frame of the machine are two pins 56, 57, preferably provided with rollers, such pins being so positioned that they will be in the path of the groove formed on the face of the tumbler 55. For the purpose of holding the rock shaft 53 in its clamping and unclamping position, a lever 58 is pivoted to a bracket keyed to the shaft 15, and bears on its end a roller 59 which takes into hollows or depressions 60 and 61, formed in the periphery of the tumbler, the roller being held yieldingly in said depression 60 or 61, as the case may be, by the tension of a spring 62 acting through a rod 63, as will be understood from inspecting Figs. 6, 7, 8 and 9.

Referring to Fig. 6, where the parts are adjusted for piling, it will be observed that sucker-mouths 36 have just been withdrawn from the signature, and the latter clamped by the fingers 52 against the surface 51, the fingers 52 being held in this position by the engagement of the roller 59 in the depression 61 of the tumbler 55. With the parts moving in the direction indicated by the arrow, the tumbler leaves the pin 56, and the signature is withdrawn from the hopper, falling on the surface of the element 50. As it continues to revolve, the groove in the face of the tumbler 55 engages the pin 57, and the tumbler is thereby rocked or turned from the position shown in Fig. 6 to that shown in Fig. 7, thereby rocking shaft 53, and withdrawing the fingers 52 so that they no longer grip the signature, and the latter falls on to the carrier table provided to receive it. At this instant, the sucker-mouths 36 are in contact with the bottom signature in the hoppers, and fingers 45 are withdrawn. During the time that the tumblers 55 are moving from the position shown in Fig. 7 to that shown in Fig. 6, the sucker-mouths 36 act to lower the folded edge of another signature, and at the proper instant the supporting fingers 45 are raised to support the signatures remaining in the hopper, and just as the sucker-mouths lower the signature to the proper position, member 50 has come around to the point where the beveled surface 51 contacts with the lower face of the signature, and the tumbler 55 has been rocked by the engagement of the groove in its face with pin 56 in the frame, so that the signature is again gripped as shown in Fig. 6, and the operation repeated. This operation occurs with each member 50 and for each hopper, and during all of the time that the piling operation is being performed, the pins 56 and 57 are stationary.

For piling, it is desirable that the gripping fingers should release the signature so as to cause it to fall into an approximately horizontal position, but in the insetting operation, it is desirable that the signature should not be released by the gripping fingers 52 until it has been carried around where it hangs in an approximately vertical position, and it is therefore necessary to adjust the parts so as to cause the gripping fingers 52 to retain the signature for insetting longer than it is retained for piling. This is accomplished by providing means for adjusting the releasing pin 57. This pin is mounted in a slot 64 (see dotted lines Figs. 6 to 9) formed in the frame of the machine, and by means of a suitable tightening nut or other device, may be adjusted in the slot from the position shown in Fig. 6 to that shown in Fig. 8. The operation when the pin occupies the position shown in Fig. 8 is precisely the same as that when it is in the position shown in Fig. 6, the only difference being that the operation of the tumbler to release the gripper 52 occurs later. Whether the tumbler is operated by the pins 56 and 57 for piling or for insetting, the roller 59 operates to hold the tumbler, and consequently the grippers 52, in the positions in which they are left by the pins 56 or 57 respectively, that is, the roller 59 holds the tumbler and the grippers in the gripping position, as shown in Figs. 6 and 8, until it is rocked to the open or non-gripping position by the pin 57, in which latter position it is again held by the roller 59 engaging the depression 60 or 61, as the case may be.

The table or support for receiving the signatures in piling consists of a long shelf or table 65, preferably slightly inclined upward from the horizontal toward its front edge, and mounted on horizontal ways 66 (Fig. 10), suitably supported on the framework of the machine at a proper distance beneath the shaft 15, and hence beneath the gripping and withdrawing devices. This table 65, when in operative position under the gripping and withdrawing devices, remains stationary, and an endless carrier is provided in the form of an endless chain 67, driven by a sprocket wheel 68 on shaft 12 (Figs. 1 and 10), and running over idler sprocket wheels 69 and 70 at opposite ends of the machine, the horizontal part of the chain between the sprocket wheels 69 and 70 traveling in a groove 71 formed in the upper surface of the table 65, so that the chain proper travels below the surface of the table. The chain, however, is provided with upwardly projecting lugs 72 properly spaced thereon, and the parts are all so adjusted that the space between these lugs 72 comes immediately under each hopper at the time when the gripping and withdrawing mechanism releases the signatures to permit them to fall upon the table.

In the operation of the machine when piling, the bottom signature in the first hopper is withdrawn by the gripping and withdrawing devices and deposited on the table 65 between two of the lugs 72, by which it is moved along the table, and just as it comes under the second hopper, the bottom signature from that hopper is withdrawn and dropped thereon, and at the same time the bottom signature in hopper No. 1 is withdrawn and dropped on the table, so that under hopper No. 1 there is one signature (the first one in the series), and under hopper No. 2 there are two signatures (the first and second ones of the series). The carrier continues to advance these withdrawn signatures along the table, and when the two signatures come under the third hopper, the third signature is dropped thereon, the second signature is dropped on the first from hopper No. 2, and the first signature is dropped from hopper No. 1, and so on throughout the entire length of the machine, or until one signature from each hopper has been withdrawn and delivered. At this point, if desired, an attendant may remove the pile of assembled signatures from the carrier at the left-hand of Fig. 1, or if desired, the piles of assembled signatures may be delivered one at a time from the carrier 67 to an endless carrier 73, Fig. 1, to be transported to any desired point of delivery.

When it is desired to use the machine for insetting, the table 65 is shoved to the forward part of the machine, off of the ways 66 and onto corresponding ways 74 (Fig. 10), the chain 67 being unshipped from the sprocket wheel 68. The tumbler pin 57 is shifted from the position shown in Figs. 6 and 7 to that shown in Figs. 8, 9 and 12, so that, as hereinbefore described, the signatures will be carried around by the gripping and withdrawing mechanism to a substantially vertical position before they are freed therefrom.

Upon being freed in a vertical position by the gripping and withdrawing devices, the signatures are then struck by a blast of air delivered from a pipe 75, and forced and held against belts 76, which belts move vertically downward between rollers 77 and 78 on the shafts 18 and 19. The belts 76 travel over pulleys on the shaft 18, which, if desired, may be formed integral with the rollers 77 and 78, but of slightly smaller diameter, so as to accommodate the thickness of the belt between the rollers. If desired, however, the belts may pass over pulleys independent of the rollers 77 and 78. These rollers 77 and 78 are, as before stated, mounted on the hollow shafts 18 and 19, and extending out through the rollers, or through spokes therein from the hollow shafts to the periphery of the roller, are passages 79 terminating at the periphery of the rollers in ports preferably provided with elastic mouth-pieces 80 (see Fig. 16). Any suitable means, as an exhaust fan, may be employed for creating a suction through the mouth-pieces 80, the passages 79 and the hollow shafts 18 and 19. As here shown (Figs. 4 and 11), the hollow shafts 18 and 19 communicate with a vertical stand-pipe 81 through chambered sleeves 82 and 83, said sleeves being connected by a telescopic or flexible coupling 84. Each of the shafts is provided with a port 85 (Figs. 11 and 14), through which it communicates with an interior chamber 86 formed in the sleeves 82 and 83, which chambers it will be seen from an inspection of Fig. 11 are in open communication with the stand-pipe 81. The shafts 18 and 19 are also provided with ports 87 (Fig. 14), which register with the passage-way 79 in the suction rollers 77 and 78, so that air is sucked or drawn in through the flexible mouth-pieces 80 of each roller.

When insetting (see Figs. 3 and 10), the signature is held against the belts 76 by an air-blast, and by said belts carried down between the rollers 77 and 78, the parts being so timed that the suction-mouths 80 of the two rolls shall come immediately opposite each other just after the lower non-folded edge of the signature is fed between the rollers. The suction maintained through the rollers and the hollow shafts thereof holds the two leaves of the signature closely to the faces of the rolls, and as the said rolls continue to revolve, and the suction-mouths thus separate and move away from each other, they act to open the signature. When the signature has been opened to the desired extent, and just before the folded edge of the signature is freed by the rolls, the scrapers 88 serve to separate the edges of the leaves of the signature from the suction-mouths 80, thus permitting the open signature to fall when the folded edge is freed from the rolls. The falling signature is received upon the table 89 (Fig. 3), which is composed of two surfaces inclined upward and inward toward each other and supported on a suitable part of the framework 90. When the signatures are delivered to the insetting saddle or table 89, they are advanced along said table by an endless carrier chain 91, having lugs 92, the chain moving in a depressed slot 93 in the top of the table, in a manner similar to that described in connection with the piling table. The endless carrier chain 91 for the insetting table is driven by a sprocket wheel 94, keyed to the shaft 12, and passes over suitable curved guides 95 and 96 at the ends of the saddle or insetting table.

For the purpose of supplying the air-blast to hold the signatures against the belts 76 at the proper point, the air-blast tube 75 is mounted in the framework of the machine so as to be capable of vertical adjustment. This is accomplished by supporting the tube 75 on standards 97, capable of being raised and lowered in sockets formed in the frame of the machine, and retained in their adjusted positions by any suitable clamping devices, as by a set-screw. This vertical adjustment not only enables the operator to adjust the air-blast to the proper level for insetting, but also enables the air-blast pipe to be lowered out of the path of the piling table 65 when the same is to be advanced from the position shown in Fig. 10 to that shown in Fig. 2 for piling. The position of the air-blast pipe for insetting is shown in Fig. 10, and the position which said pipe occupies when the machine is piling is shown in Fig. 2. It will be understood that the pipe 75 is connected with a source of air under pressure by means of a flexible hose or other pipe 98, as shown.

By reason of the spring-pressed bearings for the shaft 19, the rolls are enabled to yield for the passage of signatures of different thicknesses, and also in case any foreign substance should improperly fall between the rolls, they will yield for the passage of the same without breakage of the parts, this being a construction well understood in the mechanical arts.

The scrapers 88 may be, and preferably are, made adjustable, as by means of a slot and set screw construction 99 (Figs. 2 and 3), so that the precise relation which the scrapers shall occupy with reference to the suction rolls is readily attained.

There are a plurality of belts 76 arranged under each hopper for the reception of the signatures from that hopper, the belts being somewhat closely spaced in order to accommodate signatures of different sizes. Preferably there are five pairs of suction rolls (77—78) under each hopper, with a belt 76 for each pair of suction rolls, except the middle pair, which is preferably provided with two belts, as is clearly shown in Fig. 4.

For the purpose of controlling the suction through pipes 33 and 75, valves may be placed at any desired point in said pipes, as, for example, the valve 100 in the stand-pipe 81, as shown in Fig. 4. It will be readily understood that valves may be placed at any other point in the pipes where it is found desirable, as for example, if it is desired to cut out several of the hoppers and only operate a limited number thereof.

When the assembled signatures are delivered from the insetting saddle or table, they may be and preferably are passed directly to a stitching machine 101 (Fig. 1) and delivered from said stitching machine to a suitable off-bearing carrier 102, by which they will be delivered at any desired point; or the assembled signatures may be removed from the machine by the operator, and subsequently stitched or otherwise bound in the usual or any suitable manner.

While for the purpose of enabling the invention to be understood, the same has been herein described with some particularity as to detail of construction and form and arrangement of parts, it is not to be understood that the invention is limited to such details, since various modifications in such details may be resorted to without departing from the spirit of the invention, and the claims hereto appended are intended to cover such modifications and variations in detail as fall within the spirit of the invention as herein described.

What I claim is:—

1. In a machine of the character described, the combination of the signature-supports, revolving means for withdrawing the signatures therefrom, revolving signature-opening devices, and a table or support receiving the open signatures from said opening devices.

2. In a machine of the character described, the combination of the signature-supports, revolving means for withdrawing the signatures therefrom, revolving signature-opening devices, a table or support receiving the open signatures from said opening devices, and means moving the open signatures along said table or support.

3. In a machine of the character described, the combination of the signature hoppers, revolving means under each hopper for withdrawing the signatures therefrom, revolving signature-opening devices, carriers delivering the signatures to said opening devices, and a table or support receiving the open signatures from said devices.

4. In a machine of the character described, the combination of the signature hoppers, revolving means under each hopper for withdrawing the signatures therefrom, revolving signature-opening devices, vertically moving carriers for delivering the signatures to said opening devices, means delivering an air blast to hold the signatures against said carriers, and a table or support receiving the open signatures from said devices.

5. In a machine of the character described, the combination of the signature hoppers, revolving means under each hopper for withdrawing the signatures therefrom, revolving pneumatic signature-opening devices, carriers delivering the signatures to said opening devices, and a table or support receiving the open signatures from said devices.

6. In a machine of the character described, the combination of the signature hoppers, revolving means under each hopper for withdrawing the signatures therefrom, pneumatic signature-opening devices, carriers delivering the signatures to said opening devices, and a table or support receiving the open signatures from said devices.

7. In a machine of the character described, the combination of the signature hoppers, means under each hopper for withdrawing the signatures therefrom, pneumatic signature-opening devices, carriers delivering the signatures to said opening devices, and a table or support receiving the open signatures from said devices.

8. In a machine of the character described, the combination of a hopper for signatures having an opening in its bottom, pneumatic means bending down one edge of the bottom signature in said hopper, pivoted means moving only in a vertical plane supporting the edges of the remaining signatures in the hopper, revolving gripping mechanism withdrawing the bottom signature from the hopper, and means closing and opening said gripping mechanism.

9. In a machine of the character described, the combination of a series of signature hoppers, a suction tube, a series of suction mouths carried by said tube, means intermittently rocking said tube, whereby said suction mouths are raised one against the underside of the lowermost signature in each of said hoppers, a revolving shaft, gripping mechanism carried on said shaft, a rock shaft supporting one member of said gripping mechanism, and means for rocking said shaft, whereby said gripping mechanism is closed and opened.

10. In a machine of the character described, the combination of a pair of signature-opening rolls, means presenting the signatures one at a time to said rolls, and means receiving the open signatures from the rolls and holding them open.

11. In a machine of the character described, the combination of signature hoppers, signature-withdrawing mechanism, and a signature carrier, of signature-opening rolls coöperating with one another and receiving the signatures from said carrier said rolls having hollow shafts with passages leading from said shafts to the periphery of each roll, and means for creating a suction in said hollow shafts and passages whereby the signatures are opened by the suction through said passages.

12. In a machine of the character described, the combination with a signature-receiving hopper, signature-withdrawing mechanism and a signature carrier, of signature-opening rolls coöperating with one another and receiving the signatures from said carrier, said rolls having suction mouths or ports on their peripheries, and means for creating an inward suction at said mouths or ports.

13. In a machine of the character described, the combination with a signature-receiving hopper, signature-withdrawing mechanism, and signature carriers, of signature-opening rolls coöperating with one another and receiving the signatures from said carriers, said rolls having on their peripheries suction mouths or ports, means for creating a suction at said mouths or ports, and means removing the opened signatures from said mouths or ports.

14. In a machine of the character described, the combination of a signature-receiving hopper and signature-gripping mechanism, with adjustable means controlling the closing and opening of said gripping mechanism, whereby the gripped signature may be released in either one of two predetermined positions, one for piling and the other for insetting, and a piling table and an insetting table, the former of which is adjustable into and out of operative position.

15. In a machine of the character described, the combination of a signature-receiving hopper, a signature-gripping mechanism with adjustable means controlling the closing and opening of said gripping mechanism, whereby the gripped signature may be released in either one of two predetermined positions, one for piling and the other for insetting, and a piling table and an insetting table, one of which is adjustable into and out of operative position.

16. In a machine of the character described, the combination of a signature-receiving hopper and a signature-withdrawing means, with signature-opening rolls, a plurality of belts extending upward in a vertical plane between said rolls, an air-blast receiving the signature from said signature-withdrawing mechanism and delivering it against said carrier, and a signature-receiving table or support for receiving the opened signatures.

17. In a machine of the character described, a signature-receiving hopper, revoluble signature-grippers, means closing and opening said grippers to grip and to release the signatures, yielding means retaining said grippers in open or closed position as the case may be, and means presenting the signatures one at a time from the hopper to said gripping mechanism.

18. In a machine of the character described, the combination of a support for a series of signatures, signature-withdrawing means simultaneously withdrawing one signature from each member of the series, a saddle, a piling table supported in a plane above that of the saddle, said table being shiftable horizontally.

19. In a machine of the character described, the combination of a support for a plurality of piles of signatures, signature-withdrawing means simultaneously withdrawing one signature from each pile, and a saddle and a piling table one of which is adjustable into and out of operative position.

20. In a machine of the character described, the combination of a support for a plurality of piles of signatures, signature-withdrawing means simultaneously withdrawing one signature from each pile, and a saddle and a piling table one of which is supported in a plane above that of the other and one of which is adjusted into and out of operative position.

21. In a machine of the character described, the combination of a support for a plurality of piles of signatures, signature-withdrawing means simultaneously withdrawing one signature from each pile, and a saddle and a piling table one of which is supported in a plane above that of the other and the upper one being adjusted into and out of operative position.

22. In a machine of the character described, the combination of the signature-supports, means coöperating therewith for withdrawing the signatures therefrom, revolving signature-opening devices coöperating with one another and receiving signatures from said withdrawing means, and a support arranged below said signature-opening devices receiving the open signatures from said opening devices and holding them open.

23. In a machine of the character described, the combination of the signature-supports, revolving means coöperating therewith for withdrawing the signatures therefrom, signature-opening devices receiving the signatures from said revolving means, and a support receiving the open signatures from said opening devices and holding them open.

24. In a machine of the character described, the combination of the signature-supports, means for withdrawing the signatures therefrom, revolving signature-opening devices, a support receiving the open signatures from said opening devices, and means moving the open signatures along said support.

25. In a machine of the character described, the combination of the signature supports, revolving means for withdrawing the signatures therefrom, signature-opening devices, a support receiving the open signatures from said opening devices, and means moving the open signatures along said support.

26. In a machine of the character described, the combination of the signature hoppers, means under each hopper for withdrawing the signatures therefrom, revolving signature-opening devices, carriers delivering the signatures to said opening devices, and a support receiving the open signatures from said devices.

27. In a machine of the character described, the combination of the signature hoppers, revolving means under each hopper for withdrawing the signatures therefrom, signature-opening devices, carriers delivering the signatures to said opening devices, and a support receiving the open signatures from said devices.

28. In a machine of the character described, the combination of the signature hoppers, means under each hopper for withdrawing the signatures therefrom, revolving signature-opening devices, vertically moving carriers for delivering the signatures to said opening devices, means delivering an air blast to hold the signatures against said carriers, and a support receiving the open signatures from said devices.

29. In a machine of the character described, the combination of the signature hoppers, revolving means under each hopper for withdrawing the signatures therefrom, signature-opening devices, vertically moving carriers for delivering the signatures to said opening device, means delivering an air blast to hold the signatures against said carriers, and a support receiving the open signatures from said devices.

30. In a machine of the character described, the combination of the signature hoppers, means under each hopper for withdrawing the signatures therefrom, revolving pneumatic signature-opening devices, carriers delivering the signatures to said opening devices, and a support receiving the open signatures from said devices.

31. In a machine of the character described, the combination of the signature hoppers, revolving means under each hopper for withdrawing the signatures therefrom, pneumatic signature-opening devices, carriers delivering the signatures to said opening devices, and a support receiving the open signatures from said devices.

32. In a machine of the character described, the combination of signature-opening devices, means presenting the signatures one at a time to said devices, and means receiving the open signatures from said opening devices and holding them open.

33. A book or pamphlet making machine for assembling folded signatures, including in combination two rotary members having their axes substantially parallel and having cylindrical surfaces arranged side by side, devices for engaging a signature at its folded edge and presenting the same with its opposite edge foremost between said surfaces, and means for holding the sides of said signature against the surfaces and for releasing the opened signature from said surfaces after partial rotation of said surfaces.

34. A book or pamphlet making machine for assembling folded signatures, including in combination, a signature holder, two rotary members having their axes substantially parallel and having their surfaces arranged side by side, devices for withdrawing a signature from the holder and presenting the same with the edge opposite the fold foremost between the surfaces of said rotary members, and means for holding the sides of said signatures against said surfaces and for releasing the same after a partial rotation of said surfaces.

35. A book or pamphlet making machine for assembling folded signatures, including in combination a signature holder, two rotary members having their axes substantially parallel and having their surfaces arranged side by side, devices for withdrawing a signature from the holder and presenting the same with the edge opposite the fold foremost between the surfaces of said rotary members, and pneumatic means for holding the sides of said signatures against said surfaces and for releasing the same after a partial rotation of said surfaces.

36. A book or pamphlet making machine including in combination a series of signature-opening mechanisms, each of said signature-opening mechanisms comprising two rotary members with their axes substantially parallel and having surfaces arranged side by side, and comprising also means for holding against said rotating surfaces the sides of a signature fed with the edge opposite the fold foremost between said surfaces and for releasing said signature from said surfaces after a partial rotation thereof, a signature-supplying mechanism for each of said signature opening mechanisms for supplying thereto a signature with the edge opposite the fold foremost, means for receiving an opened signature delivered from one of said signature-opening mechanisms and progressing said open signature into position to be inset with an opened signature delivered to said receiving and progressing means from another of said signature opening mechanisms.

37. A book or pamphlet making machine including in combination a series of signature - opening mechanisms, each of said signature opening mechanisms comprising two rotary cylinders arranged side by side with their axes substantially parallel, and comprising also means for holding against said rotating cylinders the sides of a signature fed with the edge opposite the fold foremost between said cylinders and for releasing said signature from said cylinders after a partial rotation thereof, a signature-supplying mechanism for each of said signature - opening mechanisms for supplying thereto a signature with the edge opposite the fold foremost, means for receiving an opened signature delivered from one of said signature opening mechanisms and progressing said open signature into position to be inset with an opened signature delivered to said receiving and progressing means for another of said signature-opening mechanisms.

38. A book or pamphlet making machine, including in combination two opposed continuously rotating cylinders located side by side and having their axes substantially parallel, said cylinders having suction orifices therein, devices for controlling the suction through said orifices, said orifices being arranged substantially longitudinally with respect to the cylinders, devices for presenting a signature between said cylinders with the edge opposite the fold foremost, and with said edge adjacent said orifices, said controlling devices causing the suction through the orifices on each cylinder to hold the contiguous side of the signature against its cylinder, and after a partial revolution to release the opened signature.

39. A book or pamphlet making machine including in combination, two rotary members arranged side by side, the axes thereof being horizontal and parallel, devices for feeding a signature between said members from above with the edge opposite the fold foremost, means for holding each side of the signature adjacent to said open edge against the contiguous rotary member and releasing the open signature below the plane of the axes of said rotary members, and means below said rotary members for receiving the opened signature and holding it open.

40. A book or pamphlet making machine including in combination two rotary members arranged side by side, the axes thereof being horizontal and parallel, devices for feeding a signature between said members from above with the edge opposite the fold foremost, means for holding each side of the signature adjacent to said open edge against the contiguous rotary member and releasing the open signature below the plane of the axes of said rotary member, a support arranged beneath said rotary members for receiving the open signature as it is released from said rotary members and holding it open.

41. A book or pamphlet making machine, including in combination two cylinders arranged horizontally side by side with their axes substantially parallel, each of said cylinders having suction orifices arranged longitudinally thereof, means for presenting a signature between said cylinders from above with the edge opposite the fold foremost, and with the edge adjacent to said suction orifices, and means for starting and stopping the suction exerted through said suction orifices against the edge of the signature.

42. A book or pamphlet making machine including in combination two cylinders arranged horizontally side by side with their axes substantially parallel, each cylinder rotating continuously in one direction, each cylinder having suction orifices arranged longitudinally thereof, means for presenting a signature between said cylinders from above with the edge opposite the fold foremost and adjacent to said suction orifices, and means for starting and stopping the suction exerted through said orifices against the edge of the signature.

43. A book or pamphlet making machine including in combination a plurality of signature-opening mechanisms arranged in a series, and means below said opening mechanisms for receiving an opened signature dropped therefrom and progressing it so opened to a position in register with another of said mechanisms to receive an opened signature dropped from said last-mentioned opening mechanism about the outside of said first-mentioned opened signature.

44. A book or pamphlet-making machine for assembling folded signatures including in combination, a plurality of signature holding and opening mechanisms arranged in a series, devices for engaging a signature and presenting the same with the edge opposite the fold foremost to the opening mechanism, whereby each mechanism opens a signature and drops the same open edges foremost, means for receiving the open signatures dropped from one of said mechanisms and progressing it to a position in register with another of said mechanisms to receive thereupon an open signature dropped from the last mentioned opening mechanism.

45. A book or pamphlet making machine including in combination a plurality of pairs of rotary cylinders, said pairs being arranged end to end in longitudinal series, the cylinders of each pair being arranged side by side with their axes substantially parallel, means for holding against said cylinders, for a part of a rotation, the sides of a signature fed between said cylinders with the edge opposite the fold foremost for opening it, and means for progressing the open signature along said series, whereby the opened signatures are inset one within another.

46. A book or pamphlet making machine including in combination a plurality of pairs of rotary cylinders, said pairs being arranged end to end in longitudinal series, the cylinders of each pair being arranged side by side with their axes horizontal and substantially parallel, means for holding against said cylinders, for a part of a rotation, the sides of a signature fed between said cylinders from above with the edge opposite the fold foremost for opening it, and means arranged centrally of and beneath said cylinders and upon which the opened signatures are dropped from said cylinders, for progressing the opened signatures along said series whereby the open signatures are inset one within the other.

47. A book or pamphlet making machine including in combination a plurality of pairs of rotary cylinders, said pairs being arranged end to end in longitudinal series, the cylinders of each pair being arranged side by side with their axes horizontal and substantially parallel, means for holding against said cylinders for a part of a rotation, the sides of a signature fed between said cylinders from above with the edge opposite the fold foremost for opening it, a saddle arranged centrally beneath said pairs of cylinders and extending along said series, and conveying means for moving the opened signatures along said saddle.

48. A book or pamphlet making machine including in combination a plurality of pairs of continuously rotating cylinders, said pairs being arranged end to end in longitudinal series, the cylinders of each pair being arranged side by side with their axes horizontal and substantially parallel, means for holding against said cylinders for a part of a rotation the sides of a signature fed between said cylinders from above with the edge opposite the fold foremost for opening it, a saddle arranged centrally beneath said pairs of cylinders and extending along said series, and continuously moving conveying means for moving the opened signatures along said saddle at such speed that the signatures dropped from each pair of cylinders will fall upon those previously dropped from the preceding pairs of cylinders in the series.

49. A book or pamphlet making machine including in combination, a signature holder, two rotary members having surfaces arranged side by side, the axes of said members being substantially parallel, devices for engaging a signature at the back fold and withdrawing it from said holder and presenting said signature with the edge opposite the fold foremost between said rotary surfaces and means for holding the sides of said signature against the sides of the surfaces and for releasing the same after a partial rotation of said surfaces.

50. A book or pamphlet making machine including in combination, a signature holder, two rotary members having surfaces arranged side by side, the axes of said members being substantially parallel, devices for engaging a signature at the back fold and withdrawing it from said holder and presenting said signature with the edge opposite the fold foremost between said rotary surfaces, and means for holding the sides of said signature against the sides of said rotary surfaces to open it, and for releasing the same after a partial rotation of said surfaces, and a saddle arranged below and centrally with respect to said two rotary surfaces to receive the open signature after it is released from said surfaces.

51. A book or pamphlet making machine including in combination, a signature holder, two rotary members having surfaces arranged side by side, the axes of said members being substantially parallel, devices for engaging a signature at the back fold and withdrawing it from said holder and presenting said signature with the edge opposite the fold foremost between said rotary surfaces, and means for holding the sides of said signature against the sides of said rotary surfaces and for releasing the same after a partial rotation of said surfaces, a saddle arranged below and centrally with respect to said two rotary surfaces to receive the open signatures after it is released from said surfaces, and means for progressing said signature longitudinally of said saddle.

52. A book or pamphlet-making machine including in combination a plurality of signature-opening devices, means for bringing together open signatures from a plurality of said opening devices and insetting one within another, and means for stitching said signatures together.

53. A book or pamphlet making machine including in combination a plurality of signature opening devices, means for progressing an opened signature past another of said opening devices whereby said signature and another opened signature from said other opening device are brought together and one inset within the other, and means for stitching said signatures together.

54. A book or pamphlet-making machine including in combination a series of signature-holders, a series of signature-opening devices, a series of means for supplying signatures from a holder to an opening device, means extending along said series of signature holders for conveying an opened signature from one of said opening devices past other opening devices of said series in position to be inset with signatures opened by said other opening devices, whereby said conveyed signature and signatures from said other opening devices are inset one within another, and means for stitching said signatures together.

55. A book or pamphlet making machine including in combination a plurality of signature-opening devices, means for bringing together open signatures from a plurality of said opening devices and insetting one within another, and means for stitching said signatures together, while open, from the back through to the inside.

56. A book or pamphlet making machine including in combination, a plurality of means for opening a signature and delivering it partly open with the back above, means for conveying said partly opened signature past another opening and delivering means, means for partly opening another signature and delivering it open on to the outside of said first-mentioned signature, and means for stitching the opened and inset signatures together from the back through to the inside.

57. A book or pamphlet-making machine including in combination conveying means for conveying partly open signatures, a series of devices arranged along said conveying means for opening signatures and delivering them partly open to said conveying means one upon another, and means for stitching said signatures through from the back to the inside while open upon said conveying means.

58. A book or pamphlet making machine including in combination a substantially horizontal conveying means for conveying signatures partly open with the back edge uppermost and in an endwise direction considered with respect to said signatures, a plurality of devices arranged along said conveying means for opening and delivering signatures to said conveying means, one signature upon another, whereby they are inset, and a stitching device located partly above and partly below the signatures for stitching the inset signatures together.

59. A book or pamphlet making machine including in combination means for opening a signature and dropping it open upon a support, means for opening another signature and dropping it open upon said first mentioned signature and means for stitching them together.

60. A book or pamphlet-making machine including in combination conveying means, means for opening a signature and dropping it open upon said conveying means, means for opening another signature and dropping it open upon said first-mentioned signature as it is conveyed past said second opening means, whereby the signatures are inset, and means for stitching them together.

61. A book or pamphlet-making machine including in combination conveying means, means for opening a signature and dropping it open upon said conveying means, means for opening another signature and dropping it open upon said first-mentioned signature as it is conveyed past said second opening means, whereby the signatures are inset, and means for stitching said signatures together through from the back to the inside.

62. A book or pamphlet making machine including in combination conveying means, means for opening a signature and dropping it open upon said conveying means, means for opening another signature and dropping it open upon said first-mentioned signature as it is conveyed past said second opening means, whereby the signatures are inset, and means for stitching said signatures together through from the back to the inside while open upon said conveying means.

63. In a machine of the character described, the combination of a signature-opening device, means presenting signatures one at a time to said device, and means receiving the open signatures from said device and holding them open.

64. In a machine of the character described, the combination of rotary means which open and release the signatures, and an inverted V-shaped support on which the released signatures are dropped.

65. In a machine of the character described, the combination of a pair of coöperating oppositely rotating means which open the signatures, and an inverted V-shaped support on which the opened signatures are deposited.

66. In a machine of the character described, the combination of a signature-opening mechanism, and an inverted V-shaped support arranged below said signature-opening mechanism and receiving the opened signatures therefrom.

67. In a machine of the character described, the combination of a signature-opening mechanism, an inverted V-shaped support arranged below said signature-opening mechanism and receiving the opened signatures therefrom, and means progressing said signatures from under said signature-opening means.

68. In a machine of the character described, the combination of signature-supports, means for withdrawing the signatures therefrom, a signature-opening device, and a support receiving the open signatures from said opening device and holding them open.

69. In a machine of the character described, the combination of signature-supports, revolving means for withdrawing the signatures therefrom, a signature-opening device, and a support receiving the open signatures from said opening device.

70. In a machine of the character described, the combination of signature-supports, means for withdrawing signatures therefrom, a signature-opening device, a support receiving the open signatures, and means moving the open signatures along said support.

71. A book or pamphlet-making machine including in combination means for opening signatures and dropping them open on a support, means for moving said signatures along said support, and means for stitching said signatures together.

72. In a machine of the character described, the combination of rotary means which open and release the signatures, and a support on which the released signatures are dropped and held open.

73. A book or pamphlet-making machine including in combination means for opening and releasing signatures, and an inverted V-shaped support below said means on which the signatures are deposited and held open.

74. A book or pamphlet-making machine including in combination, a plurality of signature-opening mechanisms arranged in a series, a support on which an open signature is deposited and held open, and means in operative relation with said support progressing said open signature along the same into register with another of said mechanisms to receive an open signature from said last-mentioned opening mechanism about the outside of said first-mentioned open signature.

75. A book or pamphlet-making machine including in combination, a substantially horizontal conveying means for conveying signatures partly open with the back edge uppermost and in an endwise direction, and a plurality of devices arranged along said conveying means for opening and delivering signatures to said conveying means, one signature upon another, whereby they are inset.

76. A book or pamphlet-making machine including in combination, means for opening a signature and dropping it open upon a support, and means for opening another signature and dropping it open upon said first-mentioned signature.

77. A book or pamphlet-making machine including in combination, conveying means, means for opening a signature and dropping it open upon said conveying means, and means for opening another signature and dropping it open upon said first-mentioned signature as it is conveyed past said second opening means whereby the signatures are inset.

78. In a machine of the character described, the combination of a pair of signature-opening elements, means presenting signatures one at a time to said elements, and means receiving the open signatures from said elements and holding them open.

79. A book or pamphlet-making machine including in combination a pair of rotary coöperating signature-opening elements arranged side by side, and an inverted V-shaped support positioned below said elements on which the signatures are dropped and held open.

80. A signature gatherer or insetting machine for assembling folded signatures, including in combination two traveling signature-opening members between which a folded signature is presented to be opened, means for holding the sides of the signature against said members as they travel, means for releasing the open signature from said members, a signature holder, and means for gripping a signature in said holder and withdrawing it therefrom and for then advancing it while so gripped to said traveling members with the ungripped edge foremost.

81. A signature gatherer or insetting machine for assembling folded signatures including in combination, two rotary signature-opening members between which a folded signature is presented to be opened, means for holding the sides of the signature against said members as they rotate, means for releasing the open signature from said members, a signature holder, and means for gripping a signature in said holder and withdrawing it therefrom and for then advancing it while so gripped to said rotary members with the ungripped edge foremost.

82. A signature gatherer or insetting machine for assembling folded signatures including in combination, two rotary signature-opening members between which a folded signature is presented to be opened, means for holding the sides of the signature against said members as they rotate, means for releasing the open signature from said members, a signature holder, and rotary means for gripping a signature in said holder and withdrawing it therefrom and for then advancing it while so gripped to said rotary members with the ungripped edge foremost.

83. The combination of an inverted substantially V-shaped saddle, rotary means above said saddle including delivery and positioning devices for placing a creased signature with its plies open and its creased back uppermost on to the saddle, and means for conveying the signature along the saddle.

84. In a machine of the character described, the combination of a series of holders for signatures, means for withdrawing a signature from each holder, a support on which the signatures are deposited extending longitudinally of said series and provided with relatively inclined sides, one ply of a signature engaging one side and the other ply the other side, signature-opening means, and means progressing the signature from one holder into position to be inset with signatures deposited from the succeeding holders.

85. In a machine of the character described, the combination of a series of holders for signatures, means for withdrawing a signature from each holder, a support on which the signatures are deposited extending longitudinally of said series and provided with relatively inclined sides, the fold of the signature engaging the support at the junction of the sides, signature-opening means, means presenting signatures from one hopper in register with signatures deposited from succeeding hoppers and assembling them in inset relation.

86. In a machine of the character described, the combination of a series of holders for signatures, means for withdrawing a signature from each holder, and means receiving a deposited signature, signature-opening means associated therewith, and means progressing the signature along said series and presenting it opened under the next holder whereby the signature withdrawn from the latter may be associated with the other signature in inset relation.

87. The combination of a longitudinal support, a plurality of signature-opening mechanisms associated with said support, and means progressing the signatures along said support.

88. The combination of a longitudinal inverted V-shaped support, means above said support for dropping a signature astraddle said support, and means for conveying the signature along the support.

89. In a machine of the character described, the combination of a plurality of signature-holders arranged in a series, a support extending longitudinally along said series on which the signatures are held in open position, means for opening said signatures, and means progressing said signatures along said support whereby signatures from the several hoppers are assembled in inset relation.

90. A book or pamphlet making machine, including in combination a plurality of signature-depositing mechanisms arranged in a series, means below said mechanisms receiving a signature dropped therefrom and progressing it opened to a position in register with another of said mechanisms to receive a signature dropped from said last-mentioned mechanism whereby signatures from the several mechanisms are assembled in inset relation, and signature-opening means for each signature depositing mechanism.

91. The combination of an inverted substantially V-shaped saddle, means adjacent said saddle including delivery and positioning devices for placing a creased signature with its plies open and its creased back uppermost on to the saddle, and means for conveying the signature along the saddle.

92. In a machine of the character described, the combination of a plurality of signature-holders, revolving means coöperating therewith for withdrawing the signatures therefrom, signature-opening devices to which the signatures are delivered, and a support along which the signatures are fed in juxtapositoin to said opening devices.

93. A book or pamphlet making machine including, in combination, a series of signature-holders, a series of signature-opening devices, a series of means for supplying signatures from a holder to an opening device, means extending along said series of signature-holders for conveying an opened signature from one of said opening devices past other opening devices of said series in position to be inset with signatures opened by said other opening devices whereby said conveyed signature and signatures from said other opening devices are inset one within another.

94. In a machine of the character described, the combination of the signature supports, revolving means for withdrawing the signatures therefrom, signature-opening devices, a support along which the opened signatures are progressed, and means moving the opened signatures along said support.

95. A machine for insetting signatures or the like comprising a series of signature holders, means for withdrawing the signatures and discharging them at alined points, means for opening signatures arranged adjacent said points, and a conveyer operating continuously under said points to progress the signatures therealong and assemble them in inset relation.

96. In a machine of the character described, the combination of a plurality of signature-opening devices, means presenting the signatures one at a time to said devices, and means receiving the open signatures and progressing them past said devices whereby they are assembled in inset relation.

97. In a machine of the character described, the combination of a plurality of signature-holders, means for removing a signature from each holder, a support having inclined sides on which the signatures from said holders are deposited, signature-opening means, and means for bringing together signatures from a plurality of said holders and insetting one within another.

98. In a machine of the character described, the combination of a plurality of signature-holders, rotary means for removing the lowermost signature from each holder, a stationary support having inclined sides on which the signatures from said holders are deposited, a plurality of opening mechanisms arranged in a series and associated with said support, and means assembling the signatures in inset relation.

99. In a machine for insetting signatures, the combination of a plurality of signature-holders, rotary devices for withdrawing the lowermost signature from each holder in timed relation, and means for opening and assembling said signatures in inset relation.

100. A signature insetting machine comprising a support for signatures having relatively inclined sides, means for feeding signatures to said support at a plurality of points thereof, means for opening and advancing a signature fed at one point of the support to the next point at which a signature is fed to the support and associating said signatures in inset relation.

101. A signature insetting machine comprising a plurality of feeding mechanisms longitudinally arranged, a support arranged longitudinally of said feeding mechanisms on which signatures are supported with their plies separated, a signature-opening mechanism associated with each feeding mechanism, and means feeding the signatures along said support and associating the signature deposited on said support from the first feeding mechanism in inset relation with the signature deposited on said support from the second feeding mechanism and so on.

102. A signature-handling machine comprising means for supporting signatures extending longitudinally of the machine, means located at different points longitudinally of said support for feeding signatures thereto, signature-opening means adjacent said different points, and means advancing the signatures along said support and assembling them in inset relation.

103. In a machine of the character described, the combination of means for holding a plurality of piles of signatures, signature-withdrawing means simultaneously withdrawing signatures from each pile, and a support on which signatures are assembled in inset relation and a piling table one of which is located in a plane above that of the other and the upper one being adjusted into and out of operative position.

In testimony whereof I have signed this specification in the presence of two subscribing witnesses.

EDWARD R. KAST.

Witnesses:
JOHN W. HEWES,
M. E. WILLENER.